(12) United States Patent
Bowman, II

(10) Patent No.: US 12,485,851 B1
(45) Date of Patent: Dec. 2, 2025

(54) ROOF SUPPORT SYSTEM FOR TRANSPORT VEHICLES AND RELATED METHODS

(71) Applicant: Mark Willliam Bowman, II, Shippensburg, PA (US)

(72) Inventor: Mark Willliam Bowman, II, Shippensburg, PA (US)

( * ) Notice: Subject to any disclaimer, the term of this patent is extended or adjusted under 35 U.S.C. 154(b) by 0 days.

(21) Appl. No.: 19/081,801

(22) Filed: Mar. 17, 2025

(51) Int. Cl.
*B60S 5/00* (2006.01)
*B66D 3/06* (2006.01)
*B66D 5/34* (2006.01)

(52) U.S. Cl.
CPC ............... *B60S 5/00* (2013.01); *B66D 3/06* (2013.01); *B66D 5/34* (2013.01); *B66D 2700/0116* (2013.01)

(58) Field of Classification Search
CPC .... B60P 7/135; B60P 7/15; B60S 5/00; B66D 3/06; B66D 5/34
USPC .................................. 410/143, 151; 254/418
See application file for complete search history.

(56) References Cited

U.S. PATENT DOCUMENTS

| | | | | |
|---|---|---|---|---|
| 1,951,660 A | * | 3/1934 | Klaudt | A47H 1/022 248/354.3 |
| 4,508,316 A | * | 4/1985 | Millard | B66F 3/00 254/387 |
| 4,600,348 A | * | 7/1986 | Pettit | E04F 21/1822 254/3 C |
| 5,192,187 A | * | 3/1993 | Sweet | B60P 7/15 254/133 R |
| 5,284,324 A | * | 2/1994 | Bunger | B66C 1/663 248/188.7 |
| 6,942,198 B2 | * | 9/2005 | Huang | B66F 3/00 254/387 |
| 7,828,506 B1 | * | 11/2010 | Young | B66F 3/00 254/342 |
| 8,191,322 B2 | * | 6/2012 | Liestenfeltz | H01Q 1/1235 52/118 |
| 8,201,809 B2 | * | 6/2012 | Bolton | B66C 23/48 414/490 |
| 8,740,188 B1 | * | 6/2014 | Foster | B66F 3/00 248/354.1 |
| 2014/0260070 A1 | * | 9/2014 | Barcroft | B66F 3/00 52/741.1 |

* cited by examiner

Primary Examiner — Joel D Crandall
(74) Attorney, Agent, or Firm — The Bilicki Law Firm, PC; James A. Cairns

(57) ABSTRACT

A roof support system and method to stabilize the roof of a transport vehicle during repair work. The system includes a roof support assembly with a planar base, support members, a lower post, and an upper post that is slidably coupled to the lower post. A winch mounted on the lower post operates a pair of winch cables that pass through pulleys on the upper post, allowing the upper post to move upward and bring a horizontal support bar into contact with the roof.

19 Claims, 17 Drawing Sheets

ROOF SUPPORT SYSTEM FOR TRANSPORT VEHICLES AND RELATED METHODS

TECHNICAL FIELD

The present disclosure relates to a roof support system, and more particularly, to a system designed for stabilizing the roof of transport vehicles such as semi-trailers during repair work.

BACKGROUND

Transport vehicles, such as semi-trailers, are frequently used for the movement of goods across long distances. These vehicles are subject to various stresses and strains during transit, which can lead to wear and tear on various structural elements of the trailer, including the frame rails between the walls and floor of the trailer, which support some of the load placed on the walls by the roof. Over time, the frame rails may require maintenance or repair to address issues such as dents, severe scuffing, or structural weaknesses. In order to remove the frame rails the roof must first be supported to prevent it from sagging or collapsing. Traditional methods of providing support to the roof may involve cumbersome and time-consuming processes for setting up and then removing a roof support system.

A stable roof support system ensures that the roof remains secure and prevents further damage during maintenance activities. This is particularly important when replacing or repairing frame rails, as the roof must be adequately supported to avoid collapse or deformation. The development of roof support systems that can be easily installed, adjusted, and removed, and provide robust stabilization, improves the efficiency and safety of repair operations on transport vehicles.

SUMMARY

The roof support system may stabilize the roof of a transport vehicle during repair work. The system can include a roof support assembly with a planar base, multiple support members connecting the base to a lower post, and an upper post that is slidably coupled to the lower post. A winch may be mounted on the lower post, and a pair of winch cables can be attached to the winch, with loops at the far ends. Pulleys may be mounted on opposite sides of the upper post, and a horizontal support bar can be attached to the upper post. Cable attachment points may be present on the upper post for engaging the far ends of the winch cables, allowing the winch to move the upper post upward and bring the support bar into contact with the roof.

The planar base of the roof support system can be any suitable shape, including rectangular or circular.

In some examples, the roof support system with a rectangular base may have four support members extending diagonally from the corners of the base to the lower post.

The winch in the roof support system with a circular base can be a ratchet-and-pawl winch.

Some examples of the roof support system with a ratchet-and-pawl winch may include at least one retention piece attached to the lower post, extending horizontally around the upper post, allowing the upper post to slide through.

The roof support system with at least one retention piece may also have cable guides attached to the lower post, through which the winch cables can pass.

In some configurations, the cable attachment points may be horizontal projections from the upper post, with each loop of the winch cables surrounding an attachment point.

In other configurations, the cable attachment points may be horizontal projections from the upper post, with each loop of the winch cables attached to a snap hook that is hooked to an attachment point.

The horizontal support bar in the roof support system may have a length that spans at least two roof bows of the trailer ceiling, such as of at least about 48 inches.

A method for stabilizing a roof during repair work can involve providing a roof support assembly with a planar base, support members, a lower post, an upper post, a winch, winch cables, pulleys, a horizontal support bar, and cable attachment points. The method may include positioning the assembly under the roof and operating the winch to move the upper post upward, bringing the support bar into contact with the roof.

The method for stabilizing a roof may use a planar base of any suitable shape, including rectangular and circular.

In some methods, the winch may be a ratchet-and-pawl winch.

Some methods may include at least one retention piece attached to the lower post, extending around the upper post, allowing the upper post to slide through.

The method with a retention piece may also include cable guides attached to the lower post, through which the winch cables can pass.

In some methods, the cable attachment points may be horizontal projections from the upper post, with each loop of the winch cables surrounding an attachment point.

In other methods, the cable attachment points may be horizontal projections from the upper post, with each loop of the winch cables attached to a snap hook that is hooked to an attachment point.

The horizontal support bar in the method for stabilizing a roof may have a length that spans at least two roof bows of the trailer ceiling, such as of at least about 48 inches.

DETAILED DESCRIPTION

The disclosure provides a roof support system designed to stabilize the roof of a transport vehicle, such as a semi-trailer, during repair work. The system may include a rectangular base with braces extending inwardly to a lower tube made of rectangular metal tubing. This lower tube can be attached to the base and may support an upper tube that slides vertically.

A hand-operated, ratchet-and-pawl winch mounted on the lower tube can adjust the length of cables that pass through guides and pulleys, allowing the upper tube to move. The upper tube may have a horizontal support bar at its top, which can be brought into contact with the vehicle's ceiling to stabilize the roof by using the winch.

The winch cables can be secured, for example, by forming the cable ends into loops that engage with attachment points on the upper tube. The loops may be formed by any appropriate method, including but not limited to ferrules and cable clamps. The loops may engage directly with the attachment points, or may be connected to snap hooks that engage with the attachment points. The attachment points may be horizontal projections in the lower portion of the upper post. The horizontal projections may have enlarged ends to prevent the cable loops or snap hooks from sliding off the attachment points. Alternatively, the attachment points may have threaded ends, and washers may be placed over the threaded ends followed by nuts to secure the washers.

The system can be used to stabilize the roof for repair work, such as the removal and replacement of frame rails, by adjusting the position of the upper tube and maintaining the horizontal support bar in place.

For purposes of this disclosure, the upper surface of a trailer may be referred to generally as the roof, and the lower or bottom surface of the roof-what would be seen standing inside the trailer—may be referred to generally as the ceiling. However, the horizontal struts that help support the roof are generally called roof bows even though they are inside the trailer, and so technically part of the ceiling, rather than being mounted outside.

The support bar of the present roof support system should have a length sufficient to span at least two roof bows. Where the roof bows are 24 inches apart, which is common, the support bar should accordingly have a length of at least about 48 inches so that it can be positioned to span at least two roof bows. For vehicles where the distance between roof bars is other than 48 inches, the length of the support bar can be changed to ensure that it spans at least two roof bows.

Figure 1:
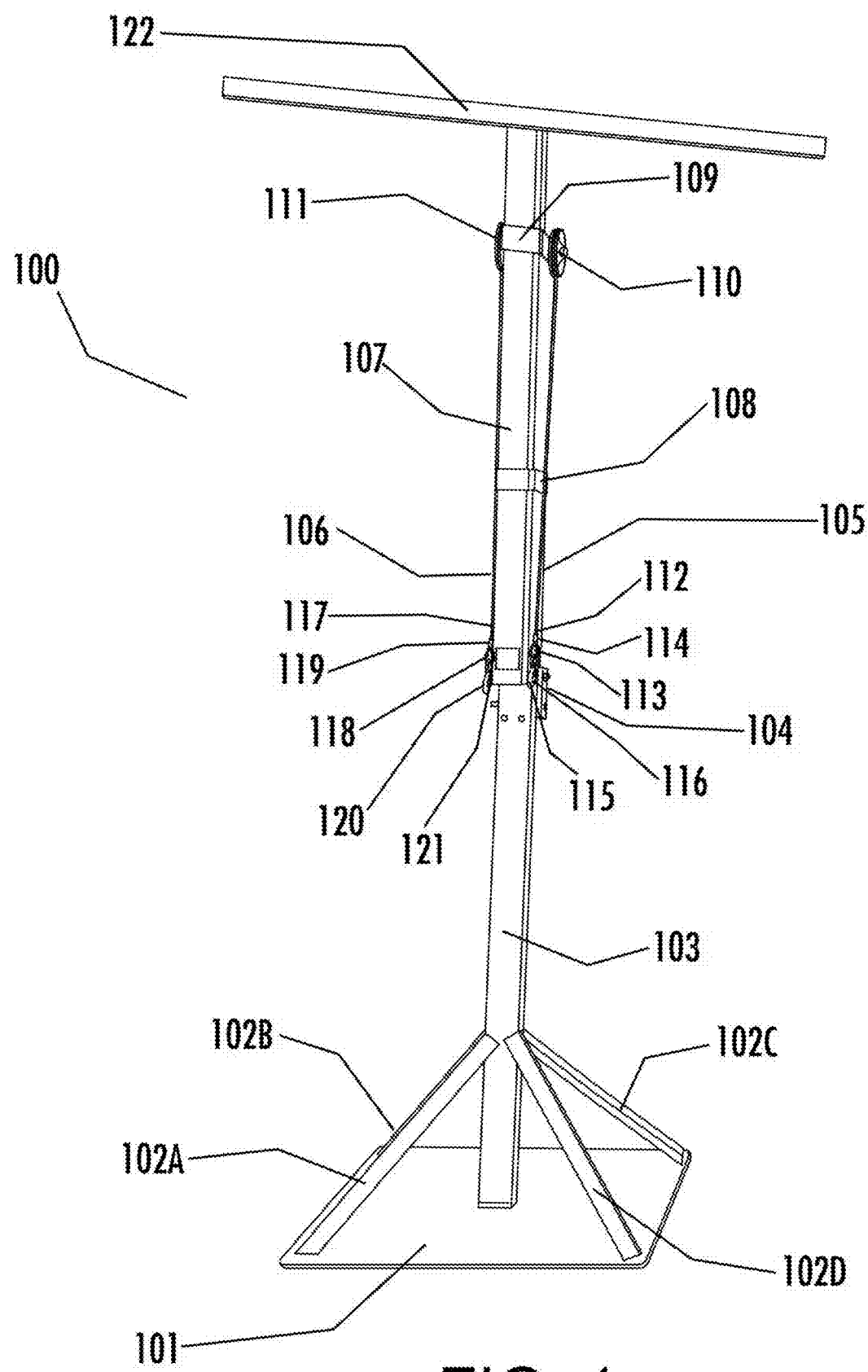
FIG. 1 is a rear perspective view of the present roof support system including planar base; support members; lower and upper posts; winch; cables; retention pieces; pulleys; cable ends with ferrules and loops; attachment points for securing the cable ends, in this case with snap hooks attached to the loops; and support bar.

Referring now to FIG. 1, the metal roof support system is depicted as an assembly (100) designed to stabilize the roof of a transport vehicle during repair work. The system comprises a planar base (101), which serves as the foundation for the system. This base is connected to a lower post (103) through a plurality of support members (102A, 102B, 102C, and 102D). It should be noted that while four support members are described herein, any number or support members that provides the desired stability to the lower post in particular and the roof support system in general may be used. Lower post 103 is vertically oriented and constructed from rectangular metal tubing. The lower post is equipped with a winch (104), generally mounted at a height of between about one-third and about one-half of the lower post's total length. This winch is a ratchet-and-pawl type, allowing for manual operation to adjust the tension of first and second cables (105 and 106, respectively).

The cables extend upward from the winch, passing through cable guides (not visible here) attached to the lower post. These guides are rectangular metal pieces with vertical grooves through which the cables pass to ensure the cables remain aligned and prevent slippage. The cables then proceed to pulleys (110 and 111) mounted on the upper post (107), which is slidably coupled to the lower post. The upper post is also made of rectangular metal tubing and is guided in its vertical movement by lower and upper retention pieces (108 and 109 respectively). These retention pieces are U-shaped metal components that wrap around the upper post, allowing it to slide smoothly while maintaining alignment.

At the top of the upper post, a horizontal support bar (122) is attached. This bar is designed to come into contact with roof bows on the vehicle's ceiling, providing the necessary stabilization during repair activities. The upper post also features cable attachment points (116, 121) on its sides. These points are horizontal projections that engage with loops or snap hooks at the ends of the winch cables. The configuration allows the winch to adjust the position of the upper post, effectively moving the horizontal support bar into contact with the ceiling to stabilize it.

The winch, when operated, winds up the cables, causing the upper post to move upward. This movement is guided by the cable guides and retention pieces. The pulleys facilitate the smooth transition of cable direction from the winch, generally upward to the pulleys, and then generally downward to the attachment points, as well as movement of the upper post, while the cable attachment points secure the cables in place.

Figure 2:
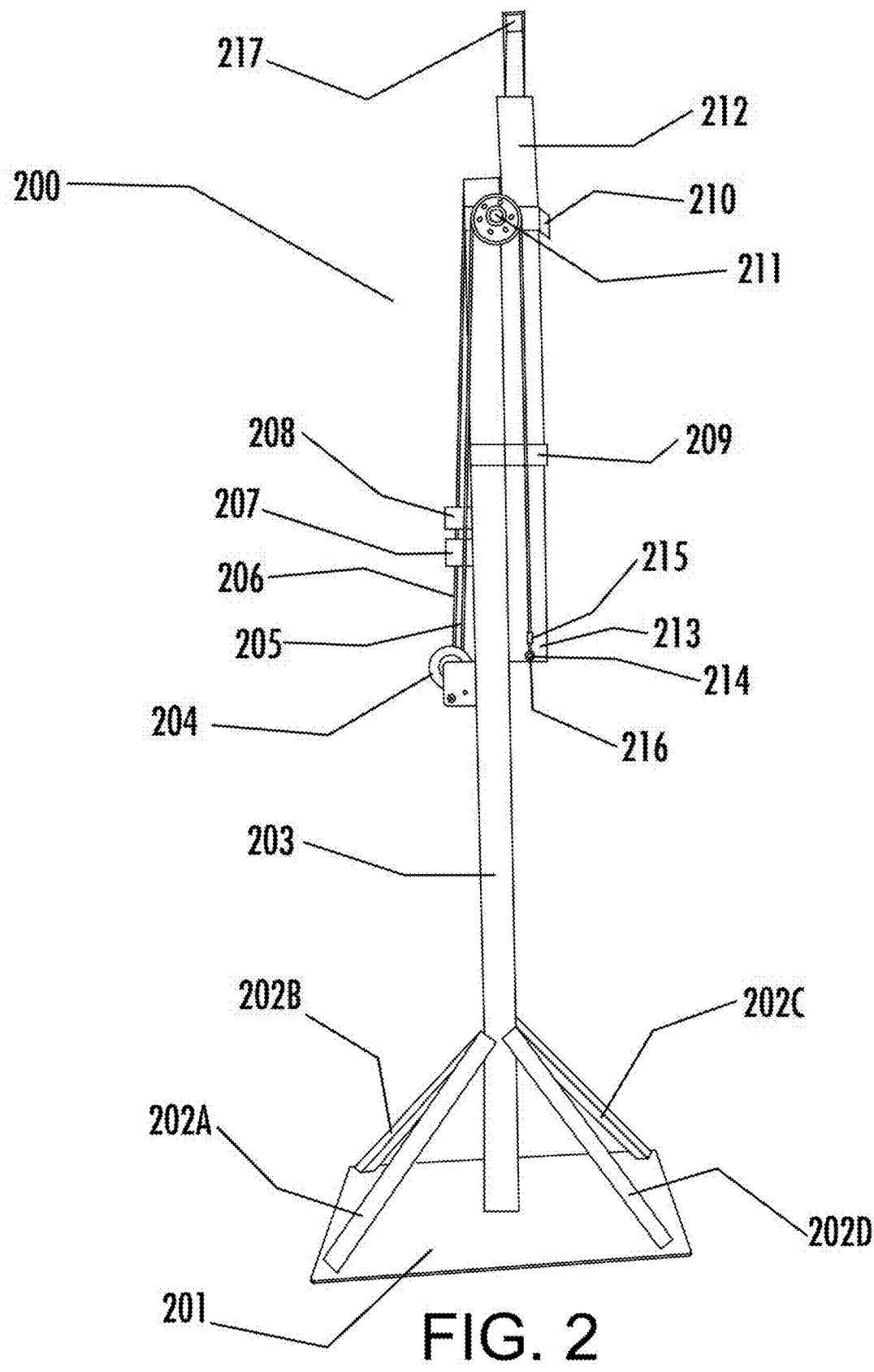
FIG. 2 is a right side view of the present roof support system.

FIG. 2 provides a right side view of the roof support system 200. The system features a rectangular base (201) that provides foundational stability. This base is connected to a vertically oriented lower post (203) by four support members (202A, 202B, 202C, and 202D). The lower post is coupled with an upper post (212) that is designed to slide vertically, allowing for adjustable positioning. A winch (204) is mounted on the lower post, facilitating the movement of the upper post through the operation of first and second winch cables (205 and 206, respectively) These cables extend upwardly from the winch; pass through first and second cable guides (207 and 208, respectively); pass around pulleys including a first pulley (211) mounted on the upper post; and are secured at cable attachment points, including first attachment point 216, on the upper post.

The first and second cables terminate in a first cable end (213) and a second cable end (not visible in this view). The cable ends may be formed by looping each cable end and securing the loop with a ferrule; FIG. 2 shows the first cable end formed into a first cable end loop (214) that is secured a first cable end ferrule (215). This configuration enables the upper post to be raised to bring the support bar (217) into or out of contact with the roof bows as needed.

Retention pieces (209, 210) are provided to guide the upper post's vertical movement, allowing smooth and controlled adjustments. When the winch is operated the cables are wound, causing the upper post to move upward through the retention pieces and bringing the support bar into contact with the roof bows. This action stabilizes the roof against sagging when the frame rails are removed.

Overall, the winch, cables, and pulleys work in unison to adjust the position of the upper post and support bar, while the support members and retention pieces provide alignment and stability.

Figure 3:
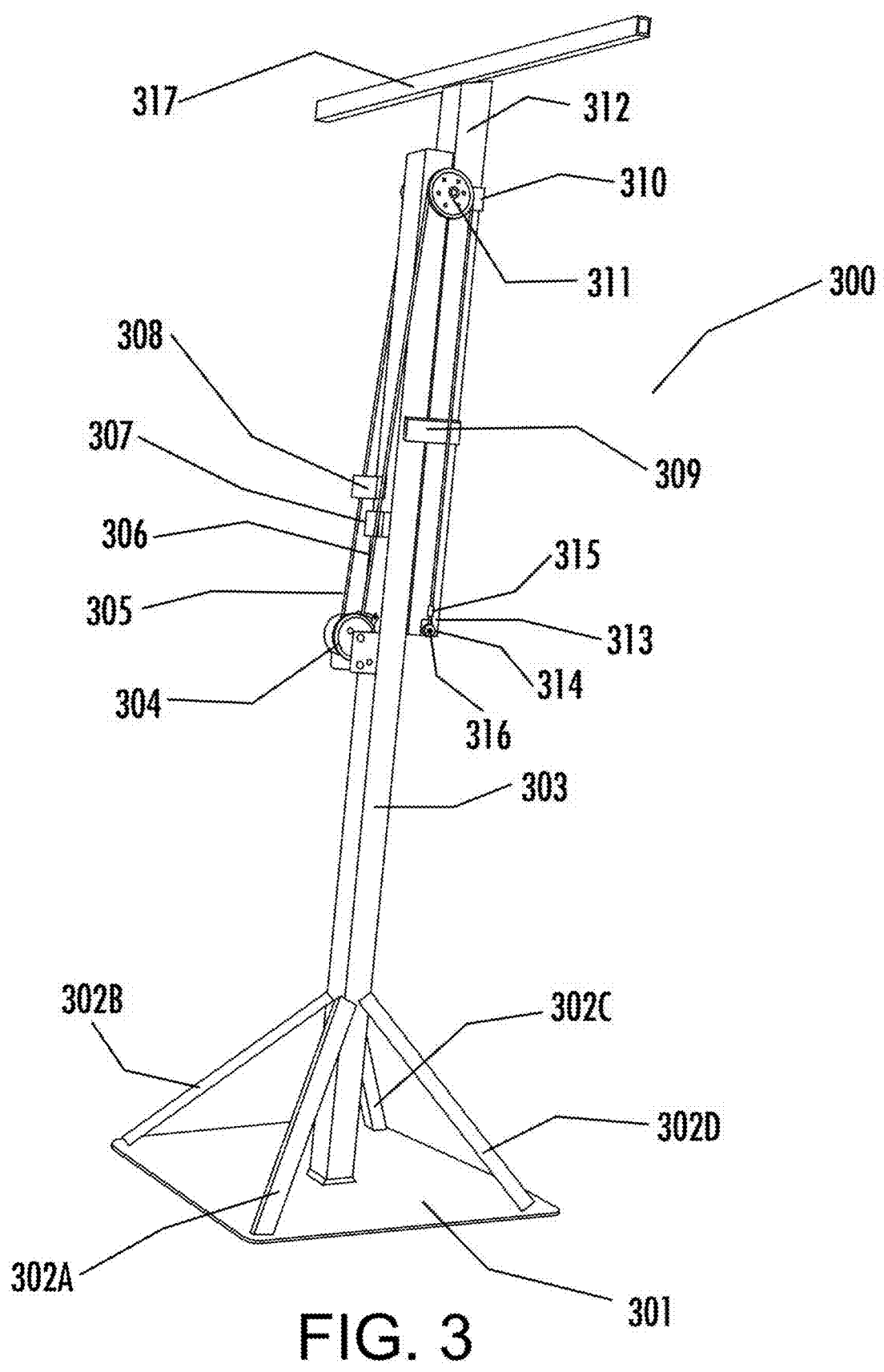
FIG. 3 is a right side perspective view of the present roof support system.

FIG. 3 is similar to FIG. 2 but provides a perspective view of the right side of roof support system 300. A base plate (301) to provide foundational stability is connected to a vertically oriented lower post (303) by four support members (302A, 302B, 302C, and 302D). The lower post is coupled with an upper post (312) designed to slide vertically through first and second retention pieces (309 and 310, respectively). A winch (304) is mounted on the lower post, facilitating the movement of the upper post through the operation of first and second cables (305 and 306, respectively) These cables extend upwardly from the winch; pass through first and second cable guides (307 and 308, respectively); pass around pulleys including a first pulley (311) mounted on the upper post; and are secured at cable attachment points, including first attachment point 316, on the upper post. The first and second cables terminate in a first cable end (313) and a second cable end (not visible in this view). The cable ends may be formed by looping each cable end and securing the loop with a ferrule; FIG. 3 shows the first cable end formed into a first cable end loop (314) that is secured a first cable end ferrule (315). The first cable end loop is looped around a first attachment point (316) on the upper post.

Figure 4:
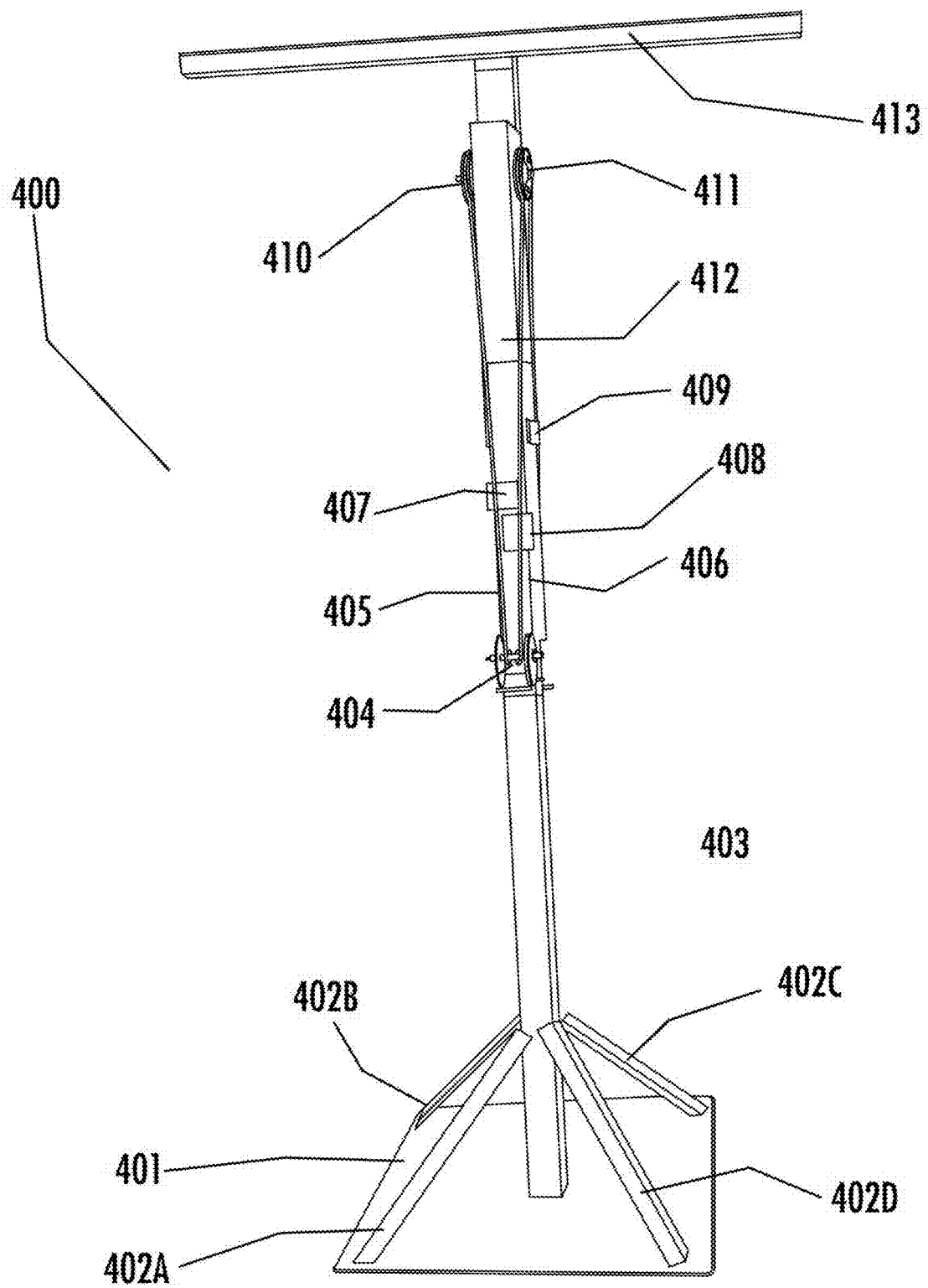
FIG. 4 is a front perspective view of the present roof support system.

FIG. 4 is a perspective front view of the present roof support system (400), including a planar base plate (401) connected to a lower post (403) through a plurality of support members (402A, 402B, 402C, and 402D) that extend diagonally from each corner of the base to provide stability and load distribution. A winch (404) is mounted to the lower post. First and second cables (405, and 406, respectively) run upwardly from the winch, through first and second cable guides (407 and 408, respectively), around first and second pulleys (410 and 411, respectively), and downwardly to first and second attachment points on the upper post (not visible in this view). These attachment points are typically horizontal projections that engage with loops or snap hooks at the ends of the cables. The winch is a hand-operated, ratchet-and-pawl mechanism that controls the movement of the winch cables.

The upper post is slidably coupled to the lower post including through a lower retention piece (409). A horizontal support bar (413) is provided at the top of the upper post, and is designed to provide a stable contact point with the roof, so that the roof remains supported during repair activities. The configuration of the winch and cables allows the upper post to be raised or lowered by winding or unwinding the winch. This movement brings the horizontal support bar into contact with the roof, stabilizing it for repair work by preventing sagging or movement of the roof.

Figure 5:
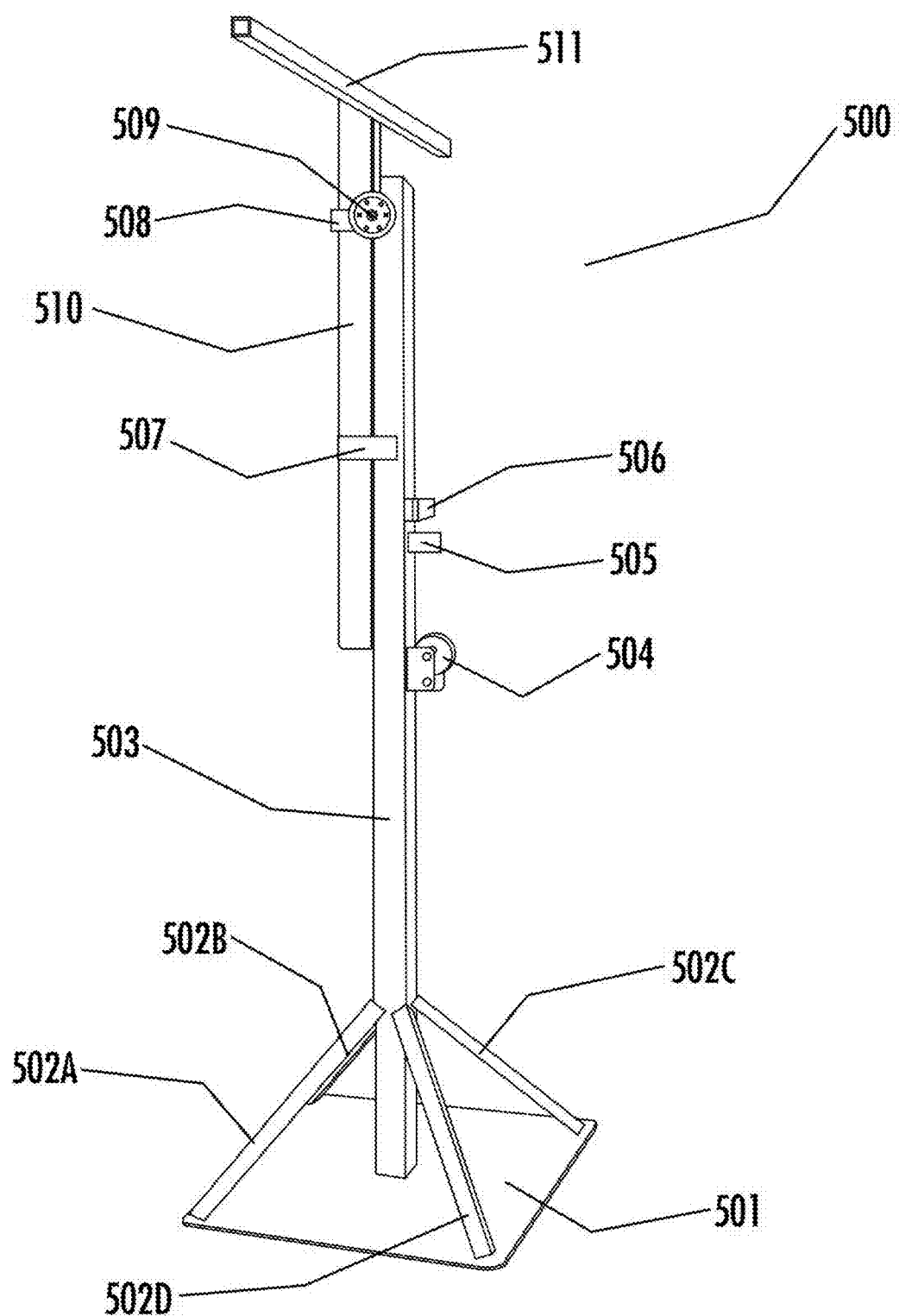
FIG. 5 is a left side perspective view of the present roof support system.

FIG. 5 is a perspective view similar to FIG. 3, but is taken from the opposite (left) side of the roof support system 500. A base plate (501) to provide foundational stability is connected to a vertically oriented lower post (503) by four support members (502A, 502B, 502C, and 502D). The lower post is coupled with an upper post (510) designed to slide vertically through first and second retention pieces (507 and 508, respectively). A winch (504) is mounted on the lower post, facilitating the movement of the upper post through the operation of first and second cables (not visible in this view) These cables extend upwardly from the winch; pass through first and second cable guides (505 and 506, respectively); pass around pulleys including a second pulley (509) mounted on the upper post; and are secured at cable attachment points (not visible here) located at the lower part of the upper post. The first and second cables terminate in a first cable end (313) and a second cable end (not visible in this view). The cable ends may be formed by looping each cable end and securing the loop with a ferrule; FIG. 3 shows the first cable end formed into a first cable end loop (314) that is secured by a first cable end ferrule (315). The first cable end loop is looped around a first attachment point (316) on the upper post. Support bar 511 is provided at the top of the second post.

Figure 6:
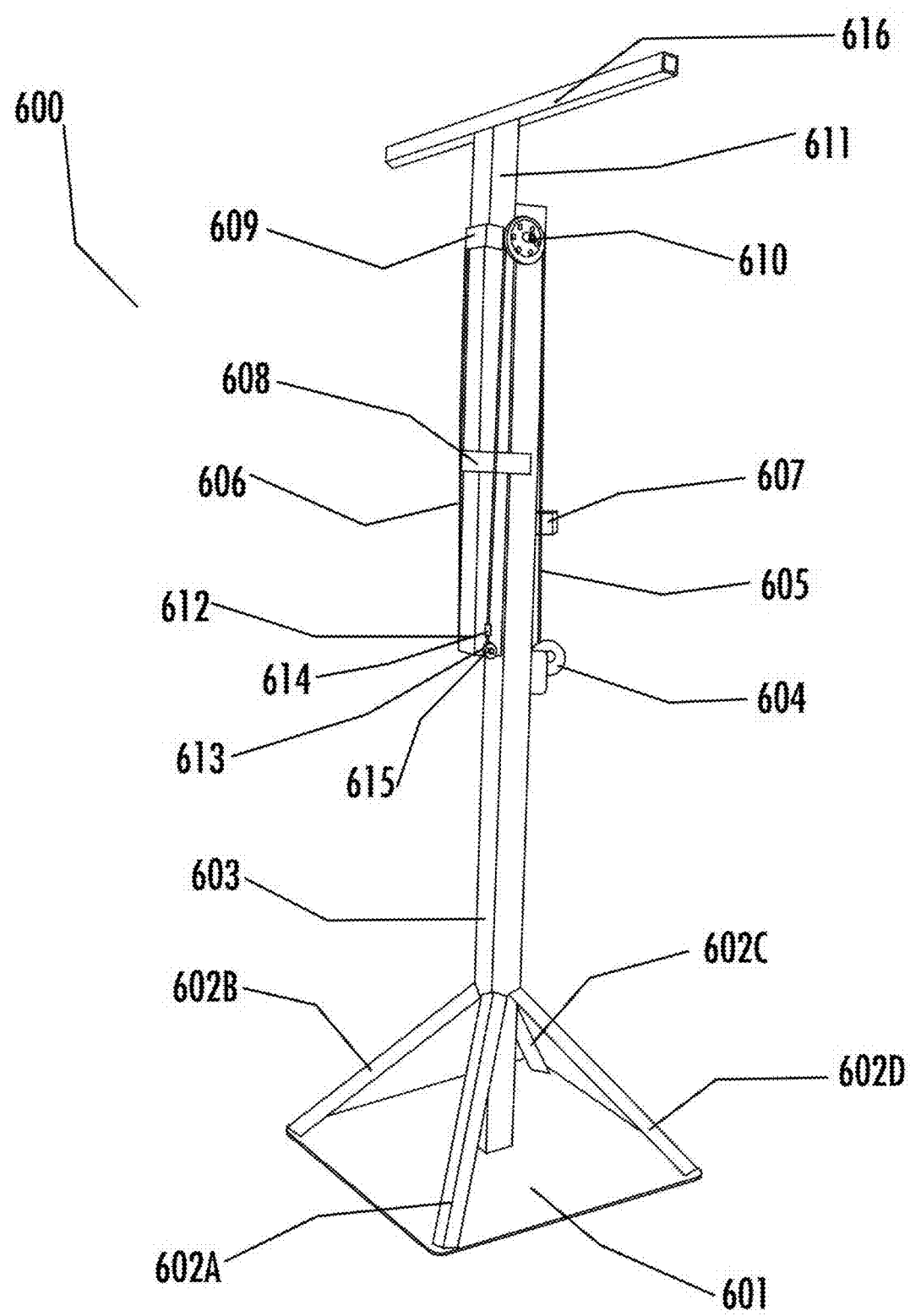
FIG. 6 is another left side perspective view of the present roof support system.

FIG. 6 another left side perspective view of the present roof support system 600, and is essentially FIG. 5 rotated about 90 counter-clockwise, now including the cables and attachment points. A base plate (601) to provide foundational stability is connected to a vertically oriented lower post (603) by four support members (602A, 602B, 602C, and 602D). The lower post is coupled with an upper post (611) designed to slide vertically through upper and lower retention pieces (608 and 609, respectively). A winch (604) is mounted on the lower post, facilitating the movement of the upper post through the operation of first and second cables (605 and 606, respectively). These cables extend upwardly from the winch; pass through a first cable guide (not visible in this view) and a second cable guides (607); pass around pulleys including a second pulley (610) mounted on the upper post; and are secured at a first attachment point (not visible here) and a second attachment point (615). The first and second cables terminate in a first cable end (not visible in this view) and a second cable end (612). The cable ends may be formed by looping each cable end and securing the loop with a ferrule; FIG. 6 shows the second cable end formed into a second cable end loop (613) that is secured with a second cable end ferrule (614). The second cable end loop is looped around the second attachment point on the upper post. Support bar 616 is provided at the top of the second post.

Figure 7:
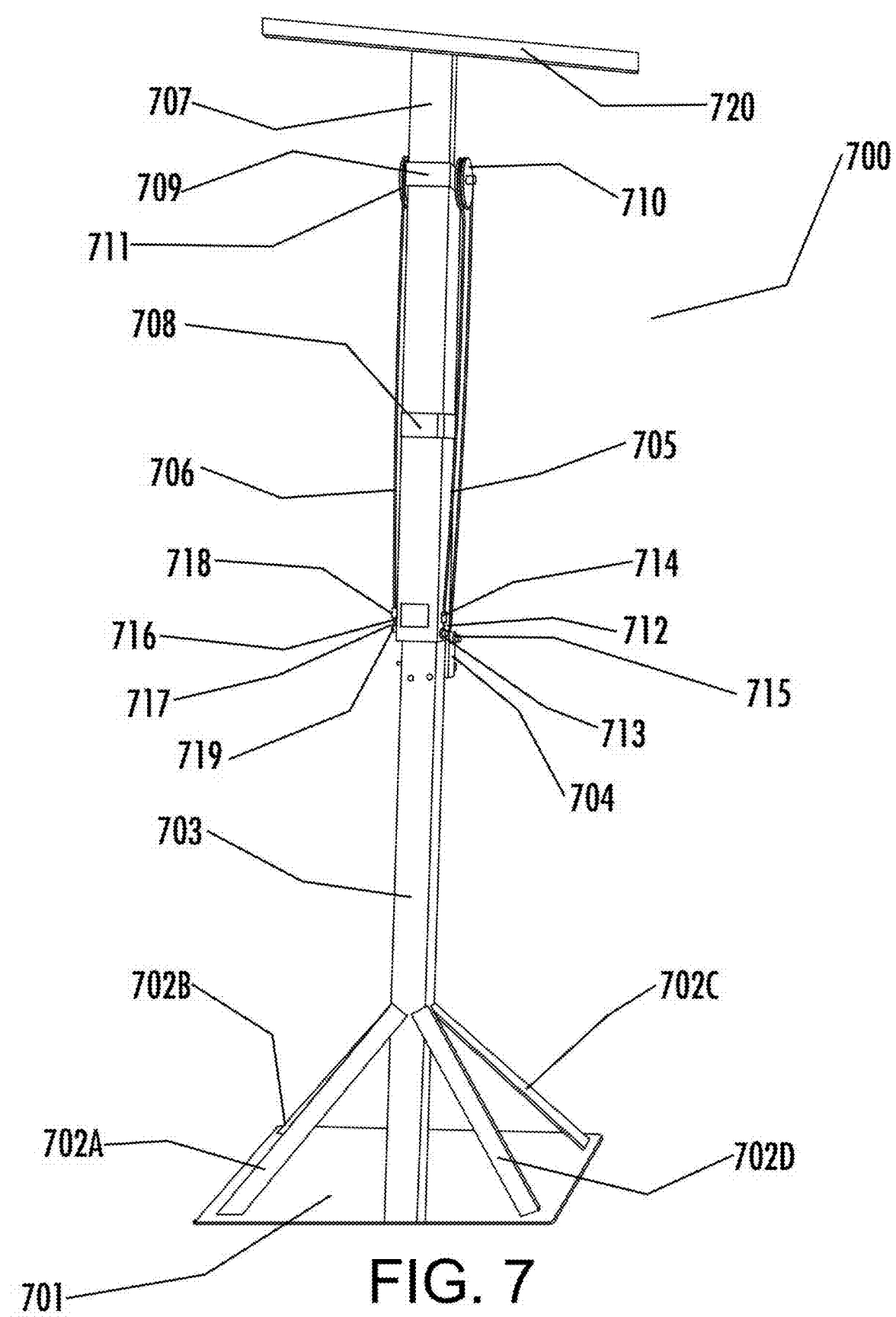
FIG. 7 is a rear perspective view of the present roof support system.

FIG. 7 is effectively the reverse of FIG. 4, and shows the present roof support system 700 including a base plate (701) connected to a vertically oriented lower post (703) by four support members (702A, 702B, 702C, and 702D). The lower post is coupled with an upper post (707) designed to slide vertically through upper and lower retention pieces (708 and 709, respectively). A winch (704, partially obscured by the lower post) is mounted on the lower post, facilitating the movement of the upper post through the operation of first and second cables (705 and 706, respectively). These cables extend upwardly from the winch; pass through first and second cable guides (not visible in this view); pass around first and second pulleys (710 and 711, respectively); and are secured at first and second attachment points (715 and 719, respectively). The first and second cables terminate in a first cable end and a second cable end (712 and 716, respectively). The cable ends may be formed into a first cable end loop and a second cable end loop (713, partially obscured, and 717, respectively), using a first cable end ferrule and a second cable end ferrule (714 and 718, respectively). The cable end loops may be secured around a first attachment point and a second attachment point (715 and 719, respectively). Support bar 720 is provided at the top of the second post.

Figure 8:
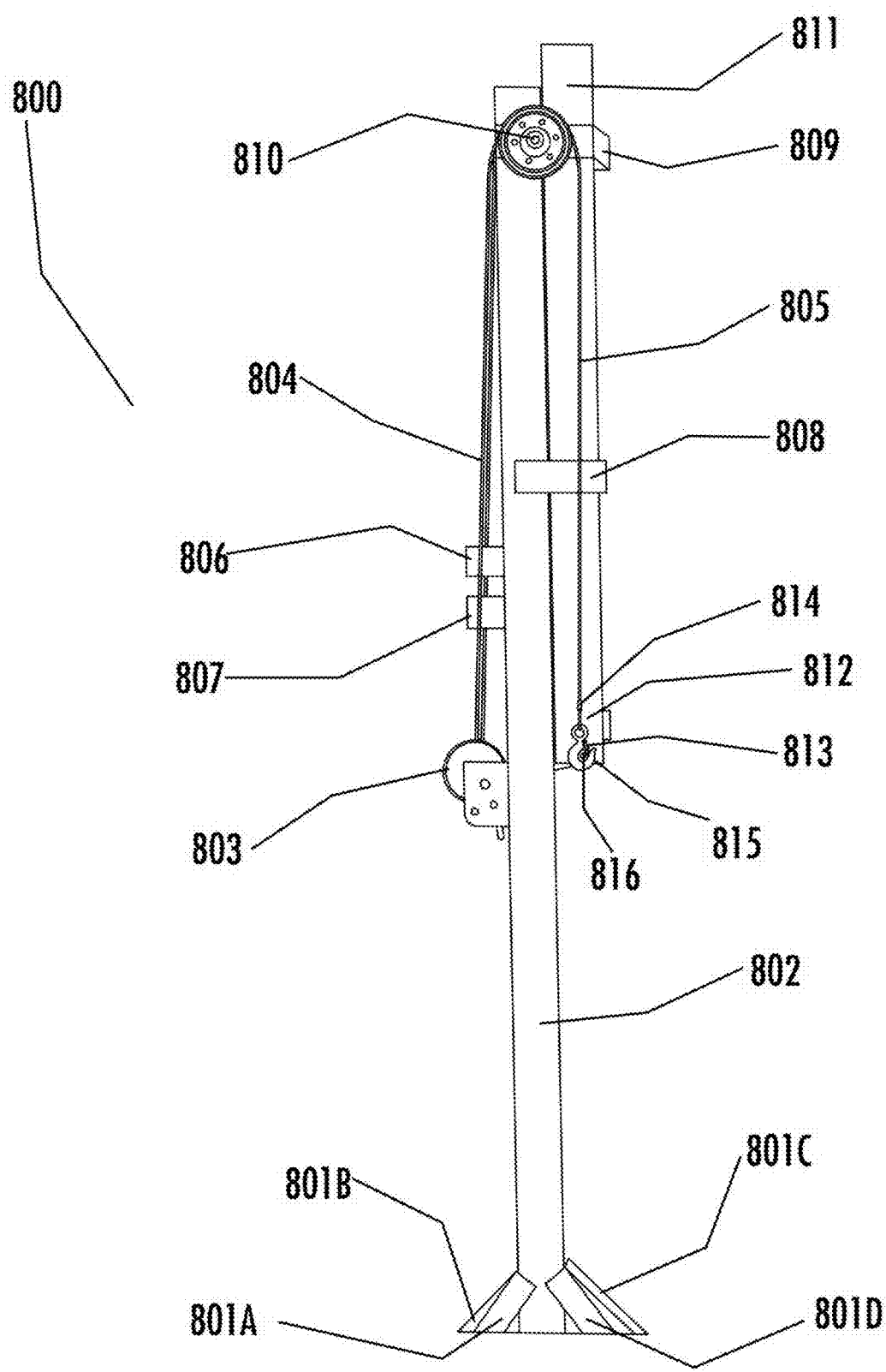
FIG. 8 is a partial right side view of the present roof support system.

FIG. 8 provides a partial right side view of the present roof support system, truncated at top and bottom. Starting at the bottom, four support members (802A, 802B, 802C, and 802D) connect from the corners of a base plate (not visible) to the lower post (802). First and second cables (804 and 805, respectively) pass from a winch (803), upwardly through first and second cable guides (806 and 807, respectively), around a first pulley (810) and second pulley (not visible in this view), and downwardly to a first attachment point (816) and a second attachment point (not visible in this view) in the lower portion of the upper post. Each cable terminates in a cable end formed into a cable end loop using a ferrule; FIG. 8 shows the first cable end (812) formed into a first cable end loop (813) using a first cable end ferrule (814) Each cable end is secured to an attachment point on the lower portion of the upper post. As an alternative to placing the cable end loop around the attachment point, FIG. 8 shows a first snap hook (815) on the first cable end loop, with the snap hook positioned around the first attachment point; the second cable would follow the same arrangement.

Figure 9:
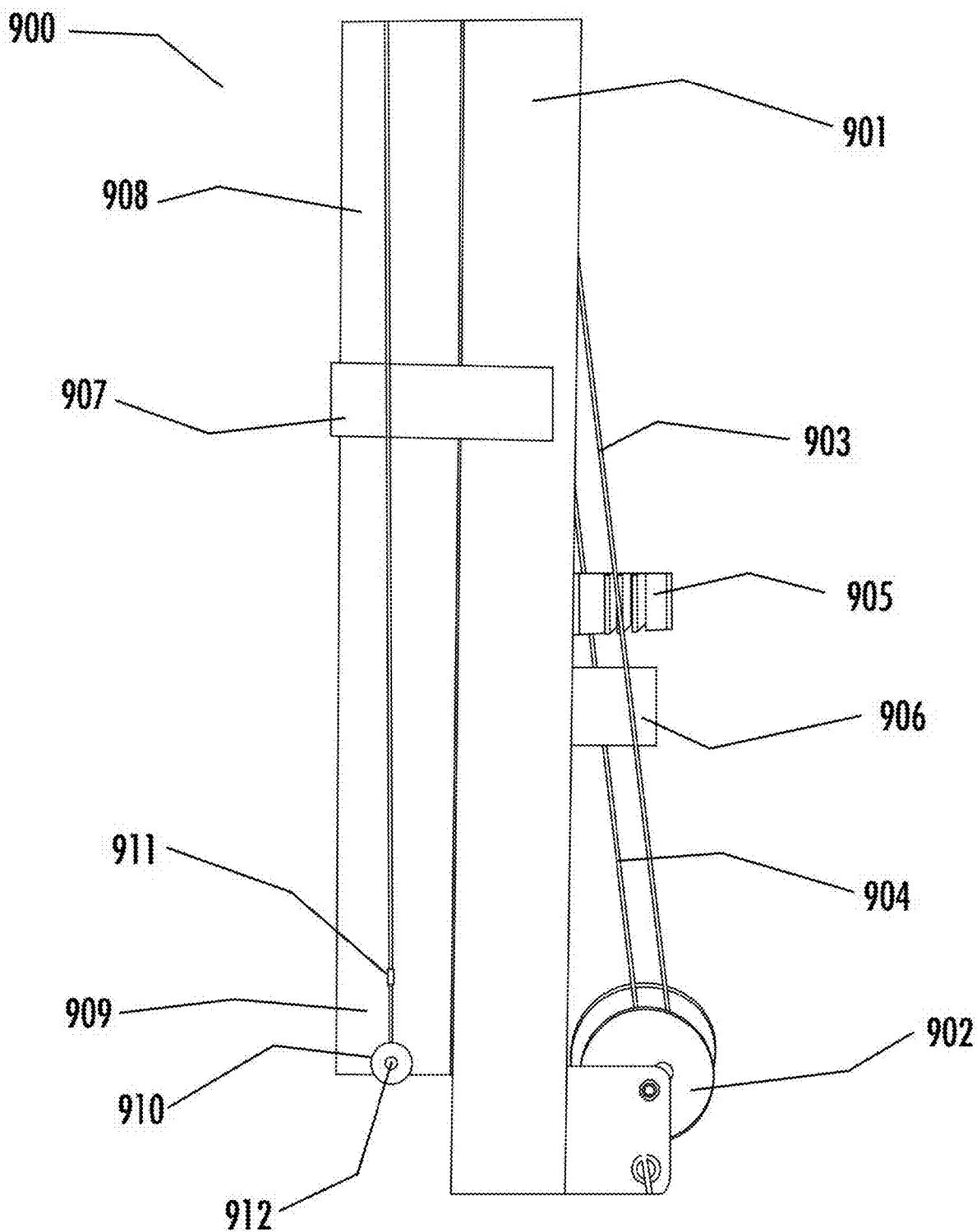
FIG. 9 is a left side detail view of a middle portion of the present roof support system including lower and upper posts, winch, cables, cable guides, cable end with ferrule and loop, and attachment point surrounded by the loop.

FIG. 9 provides a left side detail view of a middle portion of the present roof support system 900. A winch (902) is mounted on the lower post (901). First and second cables (903 and 904, respectively) pass from the winch upwardly through first and second cable guides (905 and 906, respectively). The lower post is connected with an upper post (908) with, in part, a lower retention piece (907). Each cable terminates in a cable end formed into a cable end loop using a ferrule. FIG. 9 shows the second cable end (909) formed into a second cable end loop (910, not visible in this view) using a second cable end ferrule (911). Each cable end is secured to an attachment point on the lower portion of the upper post, with the second cable end being secured to a second attachment point (912).

Figure 10:
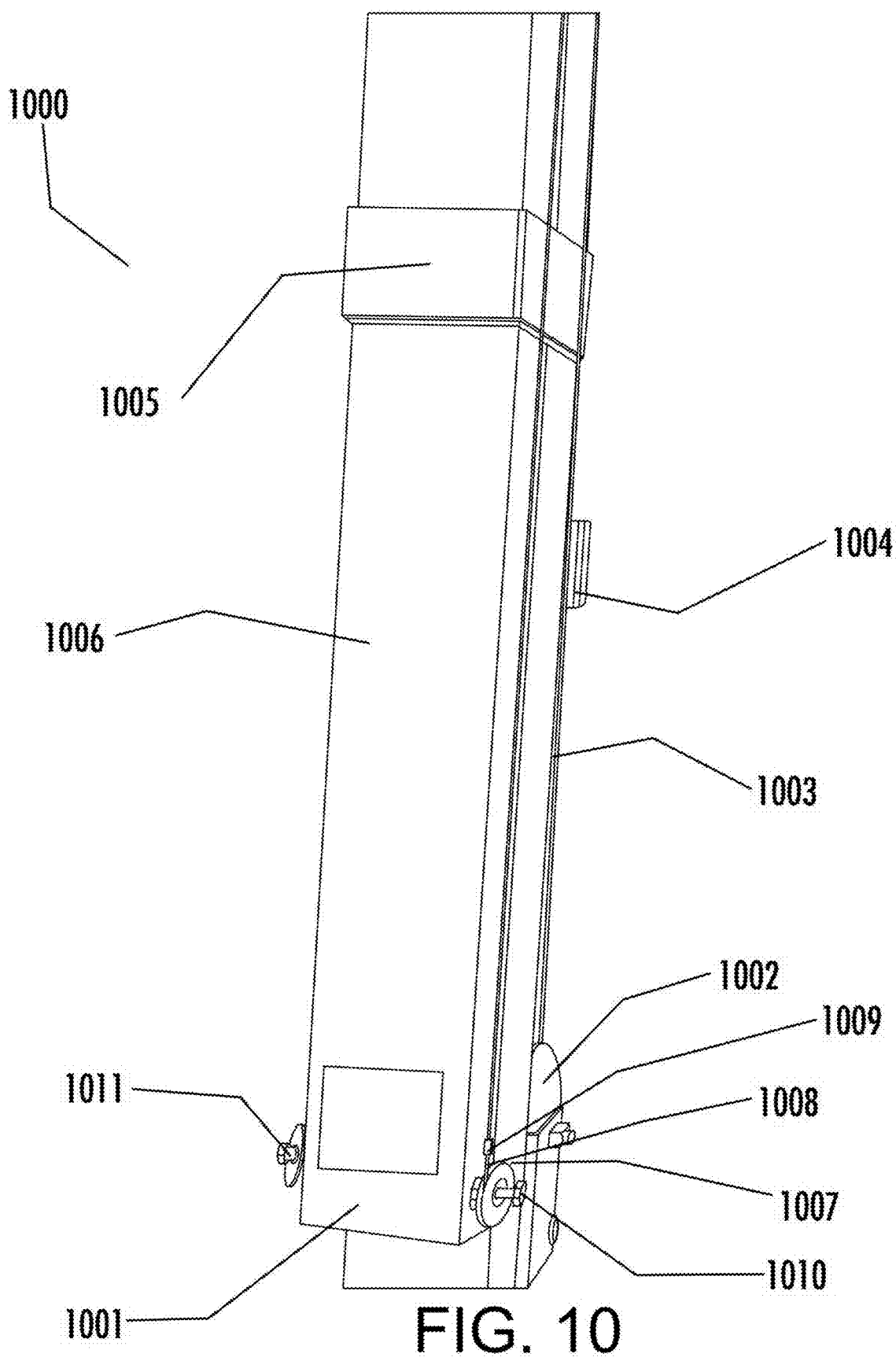
FIG. 10 is a rear perspective view of a middle portion of the present roof support system including lower and upper posts, retention piece, winch, cable, cable guide, cable end with ferrule and loop, and attachment point surrounded by the loop.

FIG. 10 provides a rear perspective view of a middle portion of the present roof support system (1000); including: lower and upper posts (1001 and 1006, respectively); the winch (1002) mounted to the lower post; the lower retention piece (1005); and the second cable (1003), with second cable end 1008, passing through the second cable guide (1004). The second cable end (1007) is formed into a second cable end loop (1009, not visible in this view) using a second cable end ferrule (1009). The second cable end loop is secured to a second attachment point (1010) on the lower portion of the upper post.

Figure 11:
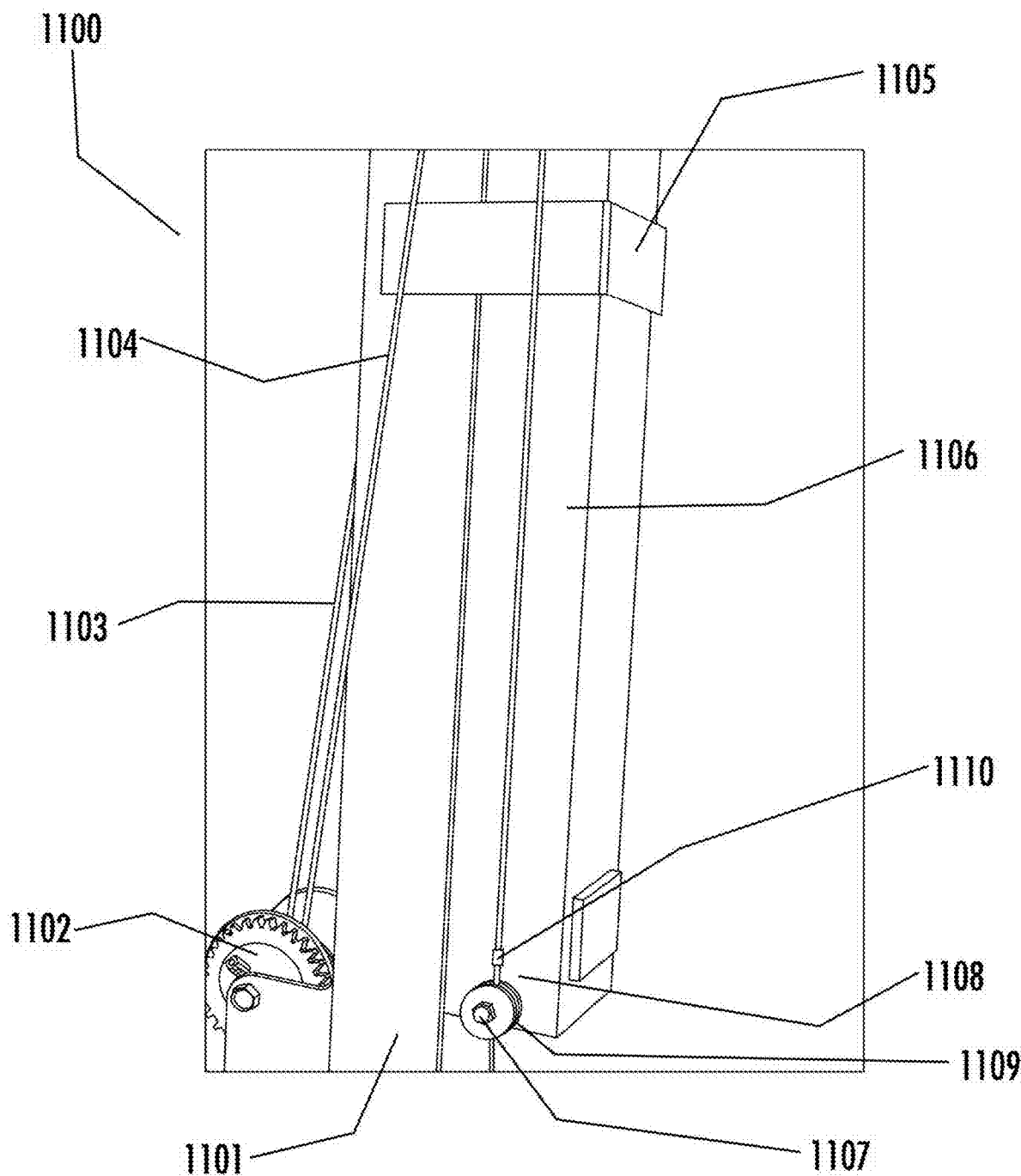
FIG. 11 is a right side perspective view of a middle portion of the present roof support system including lower and upper posts, retention piece, winch, cables, cable end with ferrule and loop, and attachment point surrounded by the loop.

FIG. 11 shows a right side perspective view of a middle portion of the present roof support system (1100), including lower and upper posts (1101 and 1106, respectively); a lower retention piece (1105); a winch (1102) mounted to the lower post; first and second cables (1103 and 1104, respectively); and a second cable end (1108) formed into a second cable end loop (1109, not visible in this view) with a second cable end ferrule (1110). The second cable end loop is connected to a second attachment point (1107) provided in the lower region of the upper post.

Figure 12:
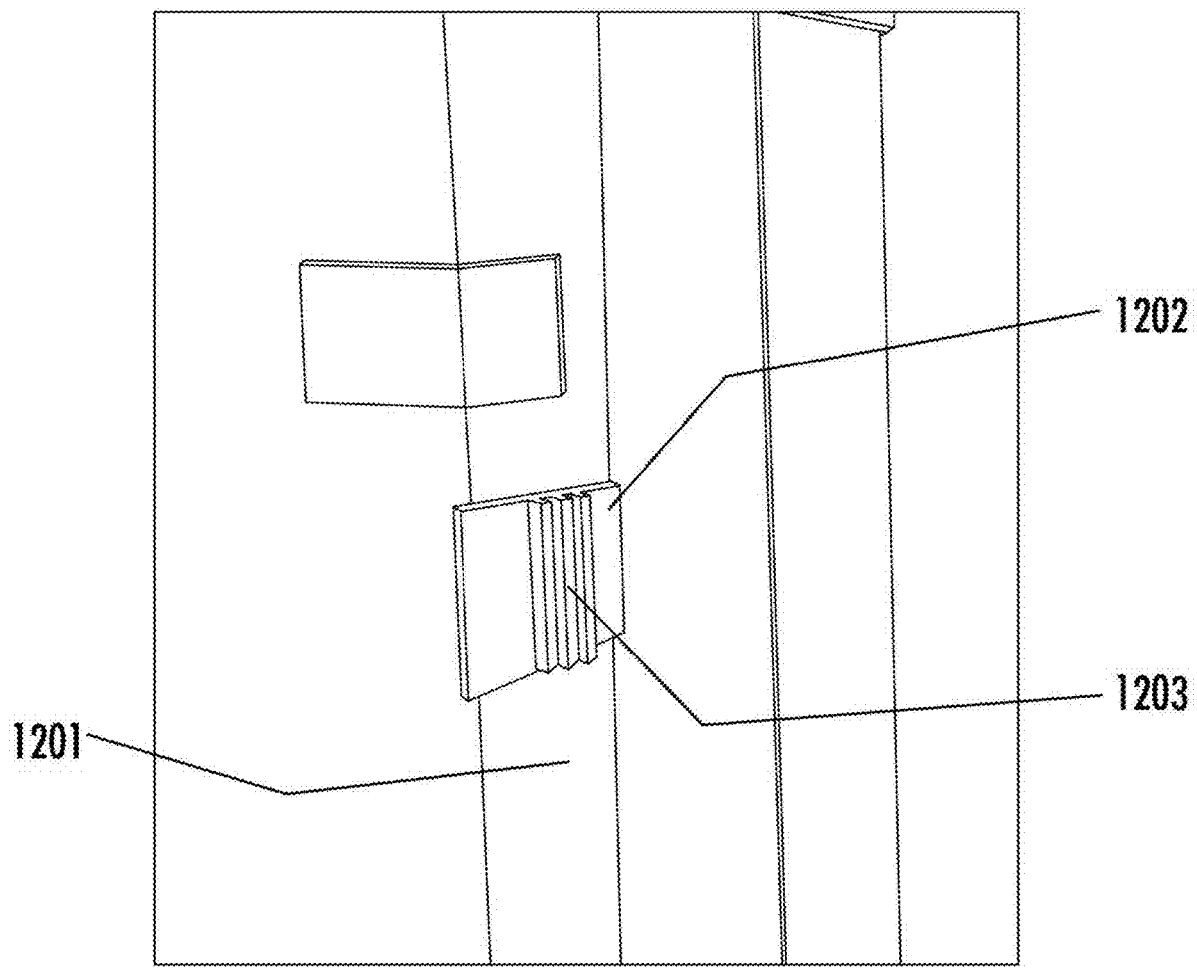
FIGS. 12 and 13 are detail views of a cable guide, showing the vertical grooves that guide the cable.
Figure 13:
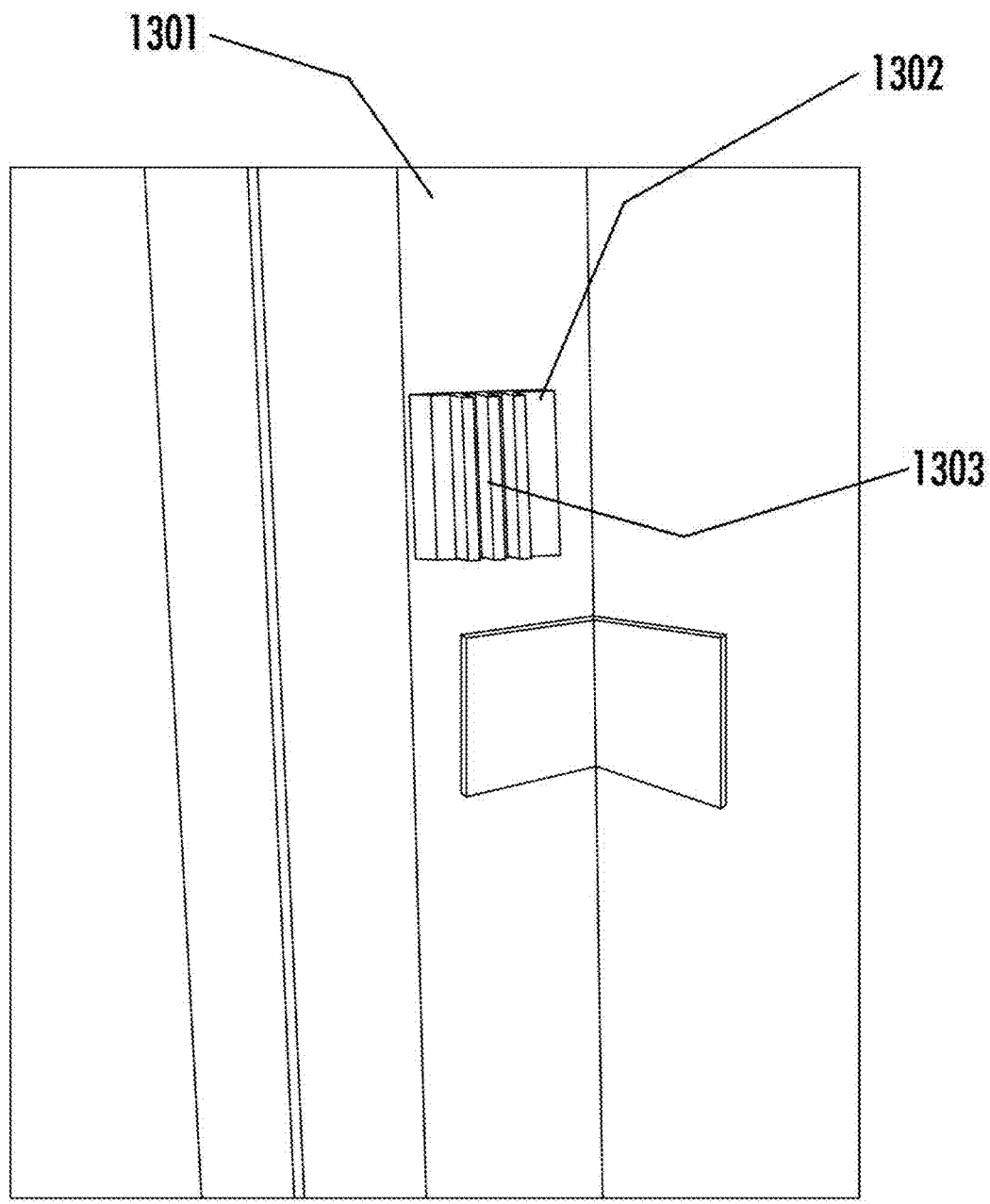

FIGS. 12 and 13 are detail views of the cable guide. FIG. 12 shows the lower post (1201) with cable guide (1202). FIG. 13 is a different angle also showing the lower post (1301) and associated cable guide (1302). In both figures it may be seen that the cable guide has a plurality of vertical grooves (1203 and 1303, respectively) through which the cables move when the winch is being operated. The grooves help ensure that the cables do not get out of alignment with the winch and/or pulleys during movement. Having more than one groove in each cable guide facilitates choosing the best path for each cable, and also provides some redundancy of protection in case a cable slips out of its initial groove, in which case it may transfer to an adjacent groove.

Figure 14:
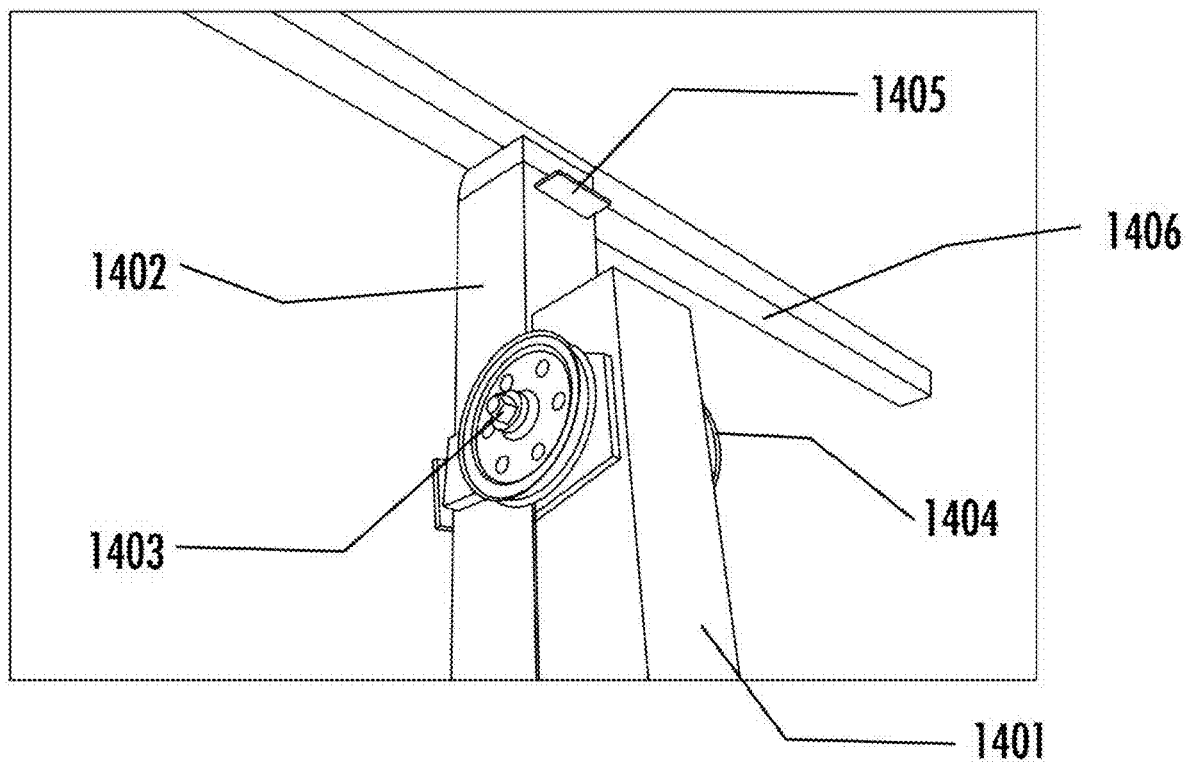
FIG. 14 is a side perspective view of the upper portion of the present roof support system including lower and upper post, pulleys, retention piece, limiter, and support bar.

FIG. 14 provides a side perspective view of the upper portion of the present roof support system, including the lower and upper posts (1401 and 1402, respectively); the first and second pulleys (1403 and, partially obscured, 1404); a limiter (1405), which limits downward motion of the upper post when it comes into contact with the top surface of the lower post; and a support bar (1406), for bracing against the roof bows by action of the winch.

Figure 15:
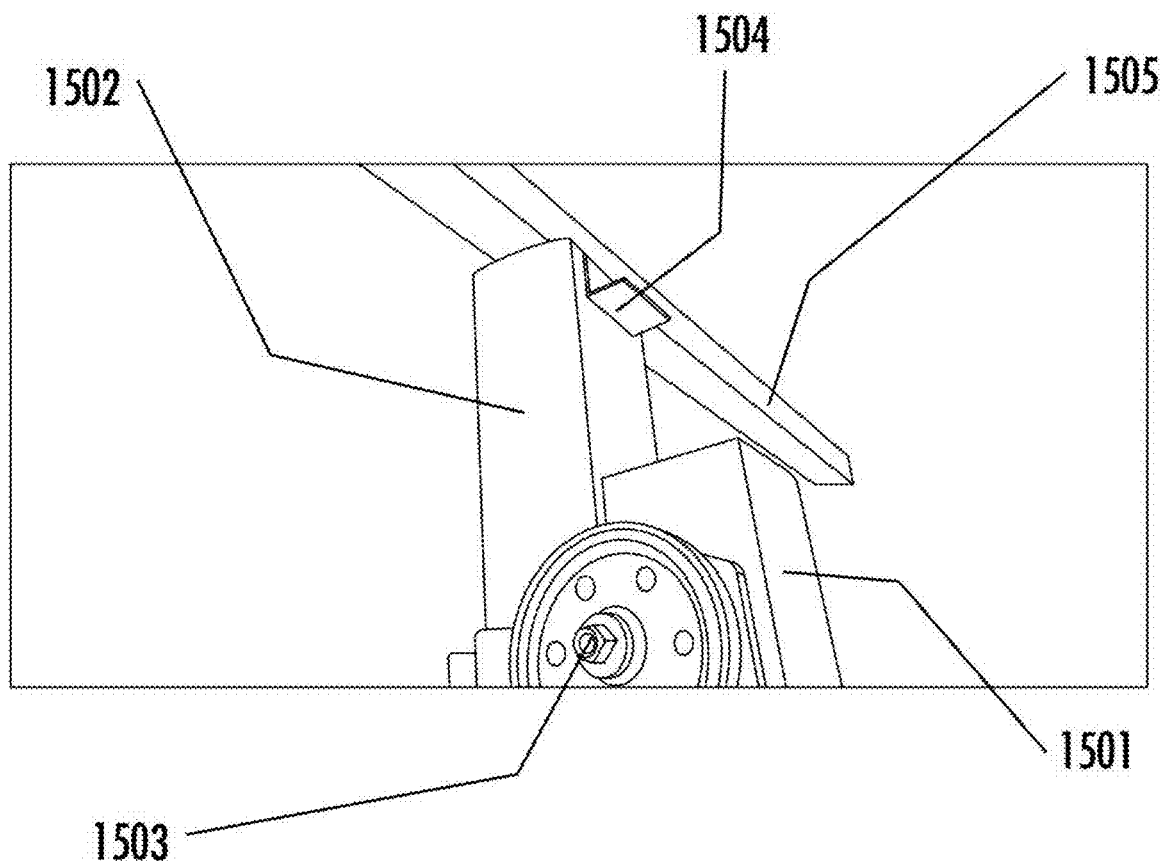
FIG. 15 is another side perspective view of the upper portion of the present roof support system including lower and upper post, pulley, retention piece, limiter, and support bar.

FIG. 15 is a magnified view of a portion of FIG. 14, showing the lower and upper posts (1501 and 1502, respectively); the first pulley (1503); the limiter (1504); and the support bar (1505).

Figure 16:
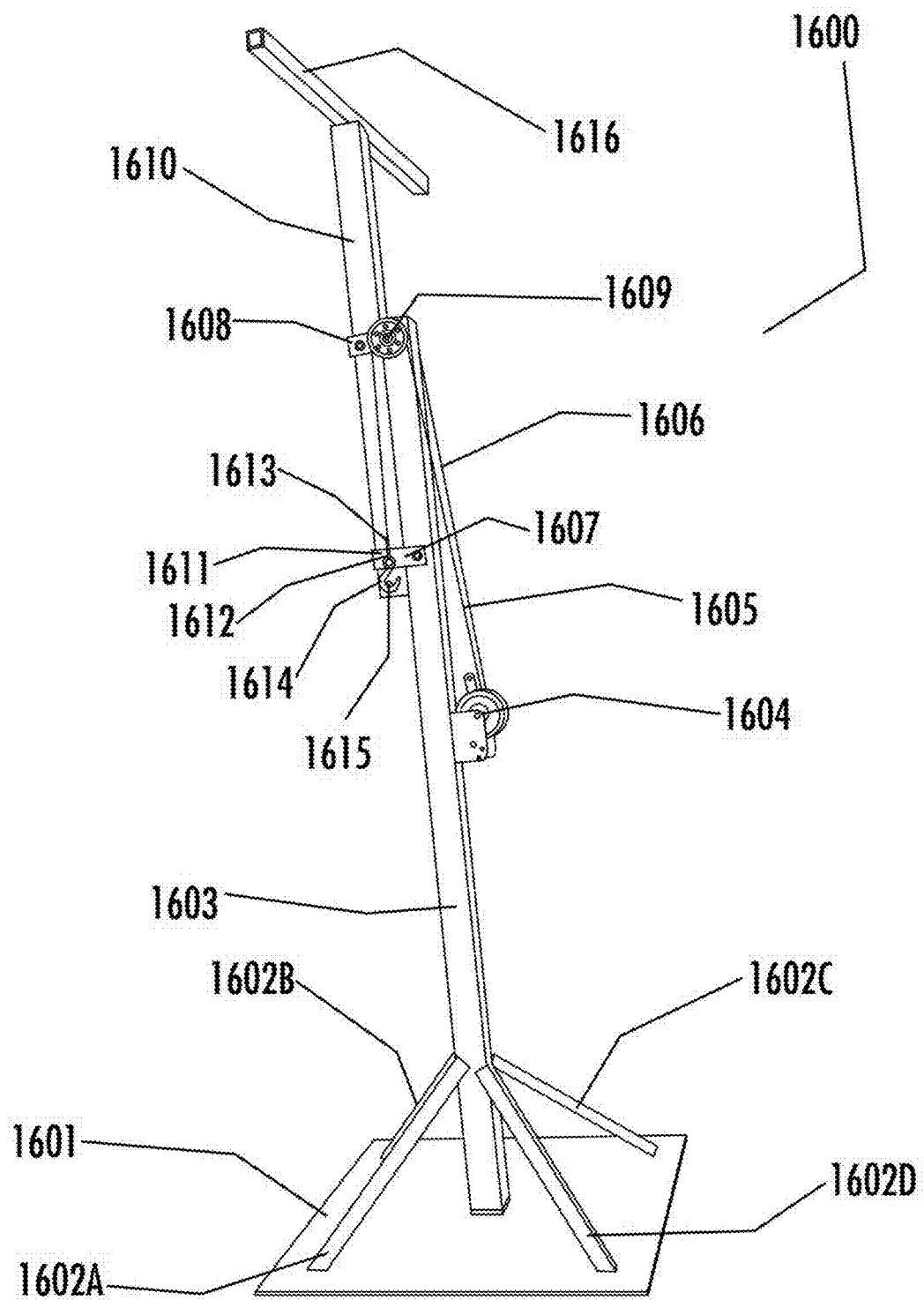
FIG. 16 is a left side perspective view of the present roof support system.

FIG. 16 presents a left side perspective view of the present roof support system (1600). A base plate (1601) to provide foundational stability is connected to a vertically oriented lower post (1603) by four support members (1602A, 1602B, 1602C, and 1602D). The lower post is coupled with an upper post (1610) designed to slide vertically through lower and upper retention pieces (1607 and 1608, respectively). A winch (1604) is mounted on the lower post, facilitating the movement of the upper post through the operation of first and second cables (1605 and 1606, respectively). These cables extend upwardly from the winch; pass around pulleys including a first pulley (1609) mounted on the upper post; and are secured at a first attachment point (1615) and a second attachment point (not visible here). The first and second cables terminate in a first cable end (1611) and a second cable end (not visible in this view). The cable ends may be formed by looping each cable end and securing the loop with a ferrule; FIG. 16 shows the first cable end formed into a first cable end loop (1612) that is secured with a first cable end ferrule (1613). The first cable end loop is connected to a first snap hook (1614) which is secured to a first attachment point (1615) on the upper post. Support bar 1616 is provided at the top of the second post.

Figure 17:
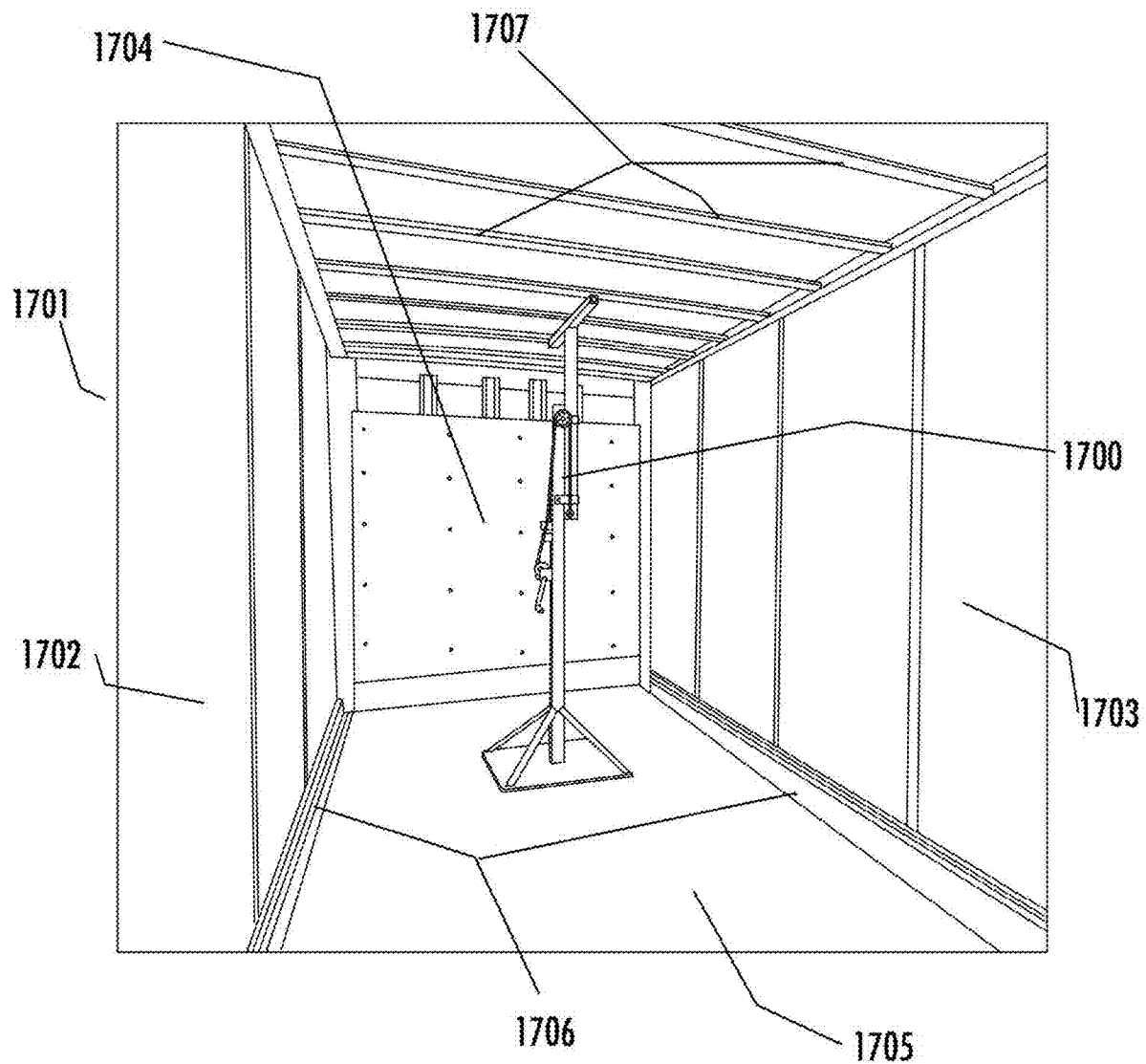
FIG. 17 is a view of the interior of a trailer with the present roof support system in place.

FIG. 17 provides a view of the interior of a trailer with the present roof support system (1700) in place. The trailer interior (1701) includes a left side wall (1702), right side wall (1703), bulkhead (1704), and floor (1705). Rails (1706), sometimes referred to as chassis rails, are interposed between the left and right side walls and the floor. Because these rails bear some of the load communicated from the roof and side walls to the floor, removing the rails under that pressure would be difficult if not impossible, and could cause damage to the walls and roof from sagging of the unsupported roof. By the present system and method, that load is instead borne by the present roof support system and the floor on which it is placed, facilitating removal of the rails and preventing the damage that can result from an unsupported roof.

The operation of the present system may be described as follows. By winding the winch the cables are shortened, causing the upper post to rise. This movement brings the horizontal support bar, affixed to the top of the upper tube, into contact with the roof of the transport vehicle, thereby resisting downward movement of the roof, stabilizing it for repair work. The ratchet-and-pawl mechanism of the winch ensures that the support bar remains securely in place once the desired position is achieved. The horizontal support bar, attached to the top of the upper post, may be held in place by the ratchet-and-pawl mechanism of the winch, which prevents any downward movement once the desired position is achieved. Releasing the pawl allows the support bar and upper post to move downwards, disengaging the roof support system from the roof so it may be removed when the work is completed.

While the present roof support system has been described herein with reference to particular embodiments, it will be understood by those skilled in the art that various changes may be made and equivalents may be substituted for elements thereof without departing from the intended scope. In addition, modifications may be made to adapt a particular situation or material to these teachings without departing from the intended scope.

What is claimed is:

1. A roof support system for stabilizing a roof of a transport vehicle during repair work, said system comprising:
   (a) a roof support assembly configured to stabilize said roof, said roof support assembly comprising:
   i) a planar base;
   ii) a plurality of support members connecting said planar base to a lower portion of a lower post;
   iii) said lower post attached to said planar base;
   iv) an upper post slidably coupled to an exterior of said lower post by at least one retention piece configured to guide said upper post;
   v) a winch mounted on said lower post at a location above where said plurality of support members connect to said lower post;
   vi) a pair of winch cables, each winch cable having a first end attached to said winch and a second end formed into a loop;
   vii) a pair of pulleys mounted on opposite sides of said upper post;
   viii) a horizontal support bar attached to said upper post; and
   ix) a pair of cable attachment points on said opposite sides of said upper post for engaging said winch cables,
   wherein said pair of winch cables passes from said winch, upward to and then around said pulleys, and down to said cable attachment points, and
   wherein said winch is operable to wind said pair of winch cables to move said upper post upward, thereby bringing said horizontal support bar into contact with said roof to stabilize said roof for repair work.

2. The roof support system of claim 1, wherein said planar base is rectangular.

3. The roof support system of claim 2, wherein said plurality of support members comprises four support members, each support member extending from a corner of the rectangular support base diagonally upwards to said lower post.

4. The roof support system of claim 1, wherein said planar base is circular.

5. The roof support system of claim 4, wherein said winch is a ratchet-and-pawl winch.

6. The roof support system of claim 5, further comprising at least one retention piece attached to said lower post and extending horizontally at least partially around said upper post, wherein said upper post slides through said at least one retention piece.

7. The roof support system of claim 6, further comprising a pair of cable guides attached to said lower post, wherein each one of said pair of winch cables passes through a respective one of said pair of cable guides.

8. The roof support system of claim 6, wherein said pair of cable attachment points are horizontal projections extending from said upper post, further wherein each loop of said pair of winch cables surrounds an attachment point.

9. The roof support system of claim 6, wherein said pair of cable attachment points are horizontal projections extending from said upper post, further wherein each loop of said pair of winch cables is attached to a snap hook and said snap hook is hooked to an attachment point.

10. The roof support system of claim 6, wherein said horizontal support bar has a length of at least 48 inches.

11. A method for stabilizing a roof of a transport vehicle during repair work, said method comprising:
   a) providing a roof support assembly comprising
   i) a planar base,
   ii) a plurality of support members connecting said planar base to a lower portion of a lower post, said lower post attached to said planar base,
   iii) an upper post slidably coupled to an exterior of said lower post by at least one retention piece configured to guide said upper post,
   iv) a winch mounted on said lower post at a location above where said plurality of support members connect to said lower post,
   v) a pair of winch cables, each winch cable having a first end attached to said winch and a second end formed into a loop,
   vi) a pair of pulleys mounted on opposite sides of said upper post,
   vii) a horizontal support bar attached to said upper post, and
   viii) a pair of cable attachment points on said opposite sides of said upper post for engaging said winch cables,
   wherein said pair of winch cables passes from said winch, upward to and then around said pulleys, and down to said cable attachment points;
   b) positioning said roof support assembly under said roof of said transport vehicle; and
   c) operating said winch to wind said pair of winch cables to move said upper post upward, thereby bringing said horizontal support bar into contact with the roof to stabilize the roof for repair work.

12. The method of claim 11, wherein said planar base is rectangular.

13. The method of claim 11, wherein said planar base is circular.

14. The method of claim 12, wherein said winch is a ratchet-and-pawl winch.

15. The method of claim 14, wherein said roof support assembly further comprises at least one retention piece attached to said lower post and extending horizontally at least partially around said upper post, wherein said upper post slides through said at least one retention piece.

16. The method of claim 15, wherein said roof support assembly further comprises cable guides attached to said lower post, and wherein said pair of winch cables passes through said cable guides.

17. The method of claim 15, wherein said pair of cable attachment points are horizontal projections extending from said upper post, further wherein each loop of said pair of winch cables surrounds an attachment point.

18. The method of claim 15, wherein said pair of cable attachment points are horizontal projections extending from said upper post, further wherein each loop of said pair of winch cables is attached to a snap hook and said snap hook is hooked to an attachment point.

19. The method of claim 15, wherein said horizontal support bar has a length of at least 48 inches.

\* \* \* \* \*